No. 769,997. Patented September 13, 1904.

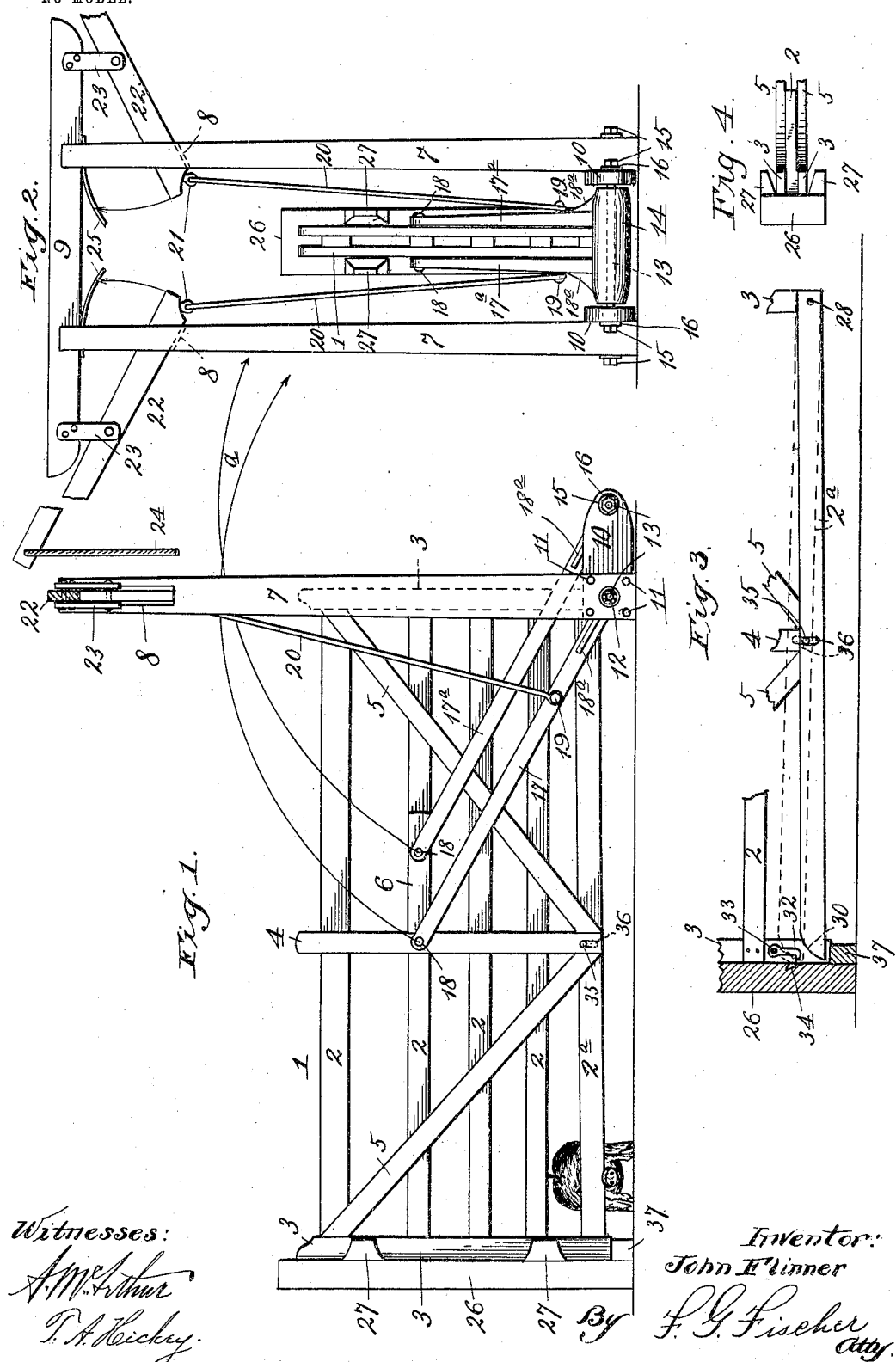

UNITED STATES PATENT OFFICE.

JOHN FLINNER, OF JARBALO, KANSAS.

GATE.

SPECIFICATION forming part of Letters Patent No. 769,997, dated September 13, 1904.

Application filed November 23, 1903. Serial No. 182,435. (No model.)

*To all whom it may concern:*

Be it known that I, JOHN FLINNER, a citizen of the United States, residing at Jarbalo, in the county of Leavenworth and State of Kansas, have invented certain new and useful Improvements in Gates, of which the following is a specification.

My invention relates to that class of gates which may be opened and closed by passengers either riding, driving, or on foot.

One of the objects of my invention is to provide a gate constructed in a novel and substantial manner so that it cannot be swayed or blown to one side by the wind while being opened or closed.

A further object is to provide means for preventing the oscillating levers which lift the gate from stopping on attaining a vertical position, and thus holding the gate in a half-open position.

A further object is to provide means for preventing hogs or other animals from elevating the gate in an endeavor to pass under the latter.

In order that the invention may be fully understood, reference will now be made to the accompanying drawings, in which—

Figure 1 represents a side elevation of my improved gate in which the movement of the latter is indicated by arrows. Fig. 2 is a rear elevation of the same. Fig. 3 is a broken detail side elevation, partly in section, of the locking device. Fig. 4 is a broken detail plan view of the gate and front post, showing the guides on the latter for directing the gate to its proper position against the post when closing and preventing said gate from swaying when in a closed position.

In said drawings, 1 designates my improved gate, which consists of a plurality of longitudinal slats 2, secured at their opposite ends by vertical slats 3 and braced about midway between said vertical slats by a pair of oppositely-disposed intermediate slats 4.

5 designates two sets of diverging slats secured to the opposite sides of slats 2 and arranged with their abutting ends against the lower portion of the intermediate slats 4 and the upper portion of the end slats 3.

6 designates a pair of filling-blocks secured to the opposite sides of one of the longitudinal slats and extending from the rear sides of the intermediate slats a suitable distance, as shown in Fig. 1.

7 designates a pair of oppositely-disposed supporting-posts placed a suitable distance apart at the rear end of the gate and connected at their upper slotted ends 8 with a transverse bar 9, the ends of which latter project beyond the outer sides of the posts, as shown in Fig. 2.

10 designates a pair of short tapering arms projecting rearwardly from the lower ends of the posts, to which they are secured by bolts 11. Said arms are provided at their opposite ends with ball-bearings 12, in which are journaled axles consisting of transverse shafts 13 and blocks 14, in which said shafts are rigidly secured, the latter being held from lateral movement in their bearings by said blocks and taps and washers 15 16, respectively.

17 17ª designate two sets of oscillating levers arranged in pairs on opposite sides of the gate for the purpose of elevating the latter in the opening or closing operation. Said levers are pivotally secured at their upper ends to the gate by pins 18 and rigidly secured at their lower ends to blocks 14. They are further secured to the blocks by brackets 18ª, which prevent their upper ends swaying in the wind while moving the gate. Levers 17 are provided near their lower ends with pins 19 for pivotal connection with the lower ends of lifting-rods 20, pivotally secured at their upper ends in staples 21, secured to the inner ends of operating-levers 22, which extend through slots 8, are fulcrumed in hangers 23, and provided at their outer ends with depending cables 24, hanging within easy reach of the passenger.

25 designates a pair of springs secured to the under side of transverse bar 9 in such position that when the inner ends of the operating-levers are elevated they will come in contact with the free ends of said springs and press them upwardly toward the bar 9.

When the gate is in a closed position, its front end rests against a front post 26 and between outwardly-flaring guides 27, secured to the upper and lower portions of the post. When in said closed position, the gate is prevented from being elevated by upward pressure on its lower longitudinal slat $2^a$ by a locking device consisting of said slat $2^a$, which is pivotally secured at its rear end to the rear vertical slats 3 by a pin 28 and rounded at its upper front corner 30 for engagement with the lower curved end of a depending latch 32, forming the other member of the locking device, pivotally secured by a pin 33 between the front vertical slats 3 and arranged with its lower end slightly above the curved portion 30 of slat $2^a$, so that when the latter is elevated it will contact with said lower end and force the hooked portion of the latter into a recess 34 in the adjacent side of post 26, thus effectually locking slat $2^a$ and the gate from further upward movement. The free end of slat $2^a$ is supported by a transverse pin 35, extending through the lower ends of intermediate slats 4, and a slot 36 in the slat, which permits the free end of the latter to move upwardly high enough to force latch 32 into engagement with recess 34. When the gate is in a closed position, its front end is supported by the lower ends of the forward slats 3 resting upon a block 37, secured to the adjacent lower side of post 26.

In operation the gate is opened by grasping and pulling downwardly on one of the depending ropes 24, which movement, through the instrumentality of the operating-levers, lifting-rods, and oscillating levers, elevates and moves the gate backwardly in the direction indicated by arrows $a$. When the oscillating levers reach a vertical position, they have a tendency to act as braces in resisting further movement of the gate and will hold the latter in an elevated position if sufficient momentum has not been given the latter by the downward pull on cable 24. This tendency of the oscillating levers to stop on attaining a vertical position is ordinarily increased by the upward pull on the lifting-rods of the operating-levers, the outer ends of which latter being the longer overbalance the inner ends; but by providing springs 25, which press downwardly upon the elevated inner ends of the operating-levers and by mounting the axles in ball-bearings it is almost impossible for the oscillating levers to stop until the gate has completed its backward movement. The above is also true in closing the gate, and in completing the latter operation the forward end of the gate is guided to its proper position by the outwardly-flaring guides 27, which hold the front end of the gate from lateral movement when the same is in a closed position.

By providing the gate with diverging slats 5 a very rigid and simple construction is obtained, and as the outer surface of said slats is flush with vertical slats 3 4 and filling-blocks 6 it is obvious they fit snugly between the oscillating levers, and consequently will prevent the gate's swaying laterally in the wind while being opened or closed.

From the above description it is apparent that I have produced a gate which is simple in construction, easy to operate, and thoroughly effective for the purpose intended.

Having thus described my invention, what I claim, and desire to secure by Letters Patent, is—

1. The combination with a gate, posts and suitable operating mechanism, of a longitudinal slat rounded at one end, pivoted at its opposite end and provided with a slot which operatively engages a transverse pin in the lower portion of the gate, and a latch suspended above the rounded end and adapted to be pressed into engagement with a recess in one of the posts by the rounded end of the slat.

2. The combination with a gate having a front post provided at its lower portion with a recess 34, oscillating levers, operating-levers, arms secured to the lower ends of the supporting-posts, ball-bearings located therein, and axles journaled in said ball-bearings carrying the lower ends of the oscillating levers, of a lock comprising a longitudinal slat pivoted at one end to the lower portion of the gate and provided with a slot which loosely engages a transverse pin in the gate, a latch suspended above the free end of said slat and adapted to be pressed thereby into engagement with the recess in the front post, and a block 37 secured to the front post for normally supporting the free end of the longitudinal slat.

In testimony whereof I affix my signature in the presence of two witnesses.

JOHN FLINNER.

Witnesses:
F. G. FISCHER,
LESLIE E. BAIRD.